(12) United States Patent
Kraus et al.

(10) Patent No.: US 11,368,003 B2
(45) Date of Patent: Jun. 21, 2022

(54) SEAMLESS ELECTRICAL CONDUIT

(71) Applicant: Applied Materials, Inc., Santa Clara, CA (US)

(72) Inventors: Philip Allan Kraus, San Jose, CA (US); Anantha K. Subramani, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/891,429

(22) Filed: Jun. 3, 2020

(65) Prior Publication Data
US 2020/0388998 A1 Dec. 10, 2020

Related U.S. Application Data

(60) Provisional application No. 62/858,738, filed on Jun. 7, 2019.

(51) Int. Cl.
*H02G 3/04* (2006.01)
*H01B 7/18* (2006.01)
*H01B 1/02* (2006.01)

(52) U.S. Cl.
CPC ........... *H02G 3/0406* (2013.01); *H01B 1/023* (2013.01); *H01B 1/026* (2013.01); *H01B 7/1875* (2013.01)

(58) Field of Classification Search
CPC ........... H01L 21/6833; H01L 21/31116; H01L 21/67069; H01L 21/67109; H01L 21/6875; H01L 21/68742; H01J 37/32009; H01J 37/32532; H01J 37/32715; H01J 2237/334; H02G 3/0406; H01B 1/023; H01B 1/026; H01B 7/1875

USPC ............................................... 174/70 R
See application file for complete search history.

(56) References Cited

U.S. PATENT DOCUMENTS

| | | | | | |
|---|---|---|---|---|---|
| 2,762,025 | A | * | 9/1956 | Melcher | H01R 24/564 174/359 |
| 3,336,563 | A | * | 8/1967 | Hyslop | H01R 13/422 174/DIG. 8 |
| 3,871,735 | A | * | 3/1975 | Herrmann, Jr. | H01R 13/53 439/585 |
| 3,982,059 | A | * | 9/1976 | Holland | H02G 15/06 174/73.1 |
| 4,046,451 | A | * | 9/1977 | Juds | H01R 24/564 439/429 |

(Continued)

FOREIGN PATENT DOCUMENTS

| | | |
|---|---|---|
| JP | 2016219790 A | 12/2016 |
| KR | 20180010133 A | 1/2018 |

OTHER PUBLICATIONS

International Search Report and Written Opinon for Application No. PCT/US2020/035709 dated Sep. 18, 2020.

*Primary Examiner* — Timothy J Thompson
*Assistant Examiner* — Michael F McAllister
(74) *Attorney, Agent, or Firm* — Patterson + Sheridan, LLP

(57) ABSTRACT

Embodiments of the present disclosure generally relate to a unitary electrical conduit that includes a central conductor, a socket coupled to a first end of the central conductor, a male insert coupled to a second end of the central conductor a dielectric sheath surrounding the central conductor, and an outer conductor surrounding the dielectric sheath, wherein a substantially 90 degree bend is formed along a length thereof.

12 Claims, 4 Drawing Sheets

(56) References Cited

U.S. PATENT DOCUMENTS

| | | | | |
|---|---|---|---|---|
| 4,426,127 A * | 1/1984 | Kubota | ............... | H01R 24/40 |
| | | | | 439/607.17 |
| 4,479,702 A * | 10/1984 | Pryor | ............... | G02B 6/4488 |
| | | | | 264/1.28 |
| 4,603,023 A * | 7/1986 | Mack | ............... | G01R 1/06783 |
| | | | | 264/261 |
| 4,896,939 A * | 1/1990 | O'Brien | ............... | G02B 6/4448 |
| | | | | 439/208 |
| 5,167,533 A * | 12/1992 | Rauwolf | ............... | H01R 24/566 |
| | | | | 439/583 |
| 5,574,815 A * | 11/1996 | Kneeland | ............... | H01B 11/1891 |
| | | | | 174/75 C |
| 6,231,357 B1 * | 5/2001 | Rumsey | ............... | H01R 13/53 |
| | | | | 439/95 |
| 6,893,290 B2 * | 5/2005 | Buenz | ............... | H01R 24/566 |
| | | | | 439/578 |
| 7,217,155 B2 * | 5/2007 | Montena | ............... | H01R 9/0518 |
| | | | | 439/578 |
| 7,448,906 B1 * | 11/2008 | Islam | ............... | H01R 9/05 |
| | | | | 439/578 |
| 9,500,812 B2 * | 11/2016 | Tanaka | ............... | H01R 13/645 |
| 10,020,095 B1 * | 7/2018 | Huang | ............... | H01B 11/1878 |
| 2001/0032591 A1 | 10/2001 | Carducci et al. | | |
| 2004/0045934 A1 | 3/2004 | Harvey et al. | | |
| 2004/0120095 A1 | 6/2004 | Yanagida | | |
| 2005/0079759 A1 * | 4/2005 | Nelson | ............... | H01R 24/566 |
| | | | | 439/578 |
| 2005/0279624 A1 | 12/2005 | Brcka | | |
| 2006/0254801 A1 * | 11/2006 | Stevens | ............... | H01B 11/1008 |
| | | | | 174/102 R |
| 2008/0277063 A1 | 11/2008 | Shin | | |
| 2012/0097332 A1 * | 4/2012 | Lin | ............... | H01L 21/67069 |
| | | | | 156/345.54 |
| 2013/0016022 A1 * | 1/2013 | Heiks | ............... | H01B 5/14 |
| | | | | 216/13 |
| 2016/0284516 A1 * | 9/2016 | Ikeda | ............... | H01J 37/32192 |
| 2016/0341227 A1 * | 11/2016 | Hoffman | ............... | C23C 16/4412 |
| 2017/0040140 A1 | 2/2017 | Tanaka et al. | | |
| 2017/0098566 A1 | 4/2017 | Long et al. | | |

* cited by examiner

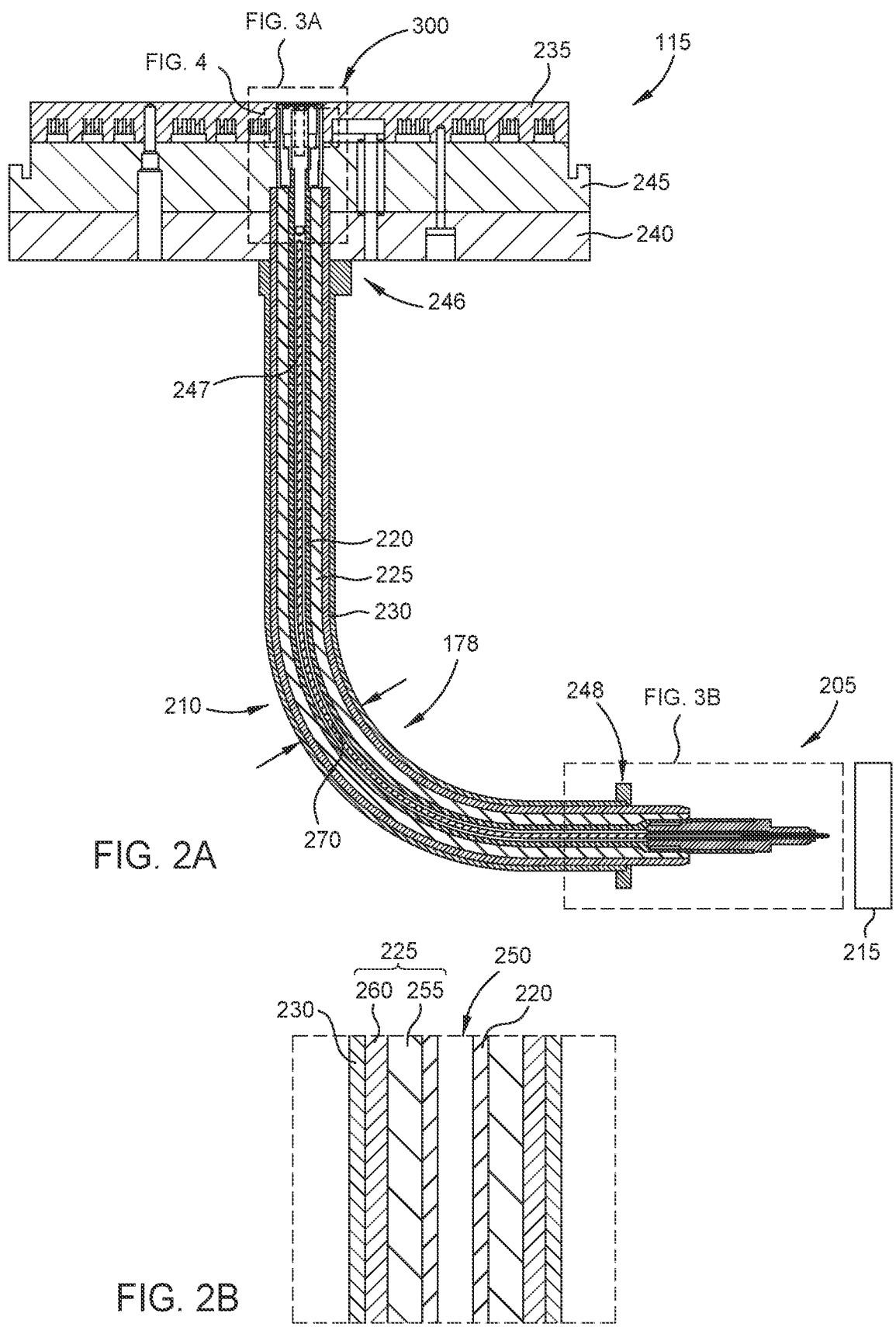

SEAMLESS ELECTRICAL CONDUIT

CROSS-REFERENCE TO RELATED APPLICATION

This application claims benefit of U.S. Provisional Patent Application Ser. No. 62/858,738, filed Jun. 7, 2019, which is hereby incorporated by reference herein.

BACKGROUND

Field

Embodiments of the present disclosure generally relate to apparatus and methods utilized in the manufacture of semiconductor devices. More particularly, embodiments of the present disclosure relate to an electrical conduit for providing power to an electrostatic chuck in a substrate processing chamber for forming semiconductor devices.

Description of the Related Art

Integrated circuits have evolved into complex devices that can include millions of transistors, capacitors and resistors on a single chip. The evolution of chip designs continually involves faster circuitry and greater circuit density. The demands for faster circuits with greater circuit densities impose corresponding demands on the materials used to fabricate such integrated circuits.

The demands for greater integrated circuit densities also impose demands on the processes used in the manufacture of integrated circuit components. For example, in processes that use electrostatic chucks include a radio frequency (RF) electrode embedded therein to facilitate generation of a plasma in the chamber, electrical conductors providing the RF power to the electrode in the electrostatic chuck tend to only function properly when low RF power is applied. When higher RF power is provided to the conventional electrical conductors, arcing can occur.

Thus, what is needed in the art are improved methods and apparatus for electrical conduits providing power to a chuck.

SUMMARY

Embodiments of the present disclosure generally relate to apparatus and methods utilized in the manufacture of semiconductor devices. More particularly, embodiments of the present disclosure relate to an electrical conduit for providing power to an electrostatic chuck in a substrate processing chamber.

In one embodiment, a unitary electrical conduit is provided that includes a central conductor, a socket coupled to a first end of the central conductor, a male insert coupled to a second end of the central conductor a dielectric sheath surrounding the central conductor, and an outer conductor surrounding the dielectric sheath, wherein a substantially 90 degree bend is formed along a length thereof.

In another embodiment, chamber is provided that includes a chamber body defining a processing volume, a substrate support movably disposed in the processing volume, and a unitary electrical conduit coupled to the substrate support. The unitary electrical conduit comprises a central conductor, a dielectric sheath surrounding the central conductor, and an outer conductor surrounding the dielectric sheath, wherein a substantially 90 degree bend is formed along a length thereof.

In another embodiment, a method for forming a unitary electrical conduit is provided. The method includes forming a straight article comprising providing a first tube made of an electrically conductive material, installing a dielectric sheath about a circumference of the first tube, providing a second tube made of an electrically conductive material to surround an outer surface of the dielectric sheath, and forming a bend in in the straight article, wherein the bend is substantially 90 degrees.

BRIEF DESCRIPTION OF THE DRAWINGS

So that the manner in which the above recited features of the present disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure can admit to other equally effective embodiments.

FIGS. 2A and 2B are schematic sectional views of the electrical conduit.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to a substrate processing chamber utilized in substrate processing in the manufacture of electronic devices. Substrate processing includes deposition processes, etch processes, as well as other low pressure, processes, plasma processes, thermal processes used to manufacture electronic devices on substrates. Examples of processing chambers and/or systems that may be adapted to benefit from exemplary aspects of the disclosure is the Producer® APF™ PECVD system commercially available from Applied Materials, Inc., located in Santa Clara, Calif. It is contemplated that other processing chambers and/or processing platforms, including those from other manufacturers, may be adapted to benefit from aspects of the disclosure.

Embodiments of the deposition chamber disclosed herein may be utilized for the fabrication of memory devices, and in particular, for the deposition of hardmasks utilized during fabrication of memory devices. Current memory devices are able to retain stored data for a very long period of time without applying a voltage thereto, and the reading rate of such memory devices is relatively high. It is relatively easy to erase stored data and rewrite data into the memory devices. Thus, memory devices have been widely used in micro-computers, and automatic control systems, etc. To increase the bit density and reduce the cost per bit of memory devices, 3D NAND (three-dimensional not AND) memory devices have been developed. Other memory devices, such as DRAM (dynamic random access memory), EM (expanded memory) and ReRAM (resistive random access memory), as well as advanced hardmask materials for forming the same, are also being developed to further facilitate advances in the semiconductor industry.

Vertical gate 3D memory cells are being explored for 3D NAND technologies to reduce cost as the number of memory cell layers increase. Oxide/silicon and oxide/nitride layer stacks are useful due to material integration advantages, but with an increasing number of memory cell layers, thickness of the layers becomes a limiting factor. Thus, while there is an interest in reducing the thickness of the memory cell layers, issues of oxide quality (i.e. breakdown voltage), silicon resistivity, and high aspect ratio etching persist with the reduced layer thickness.

Figure 1:
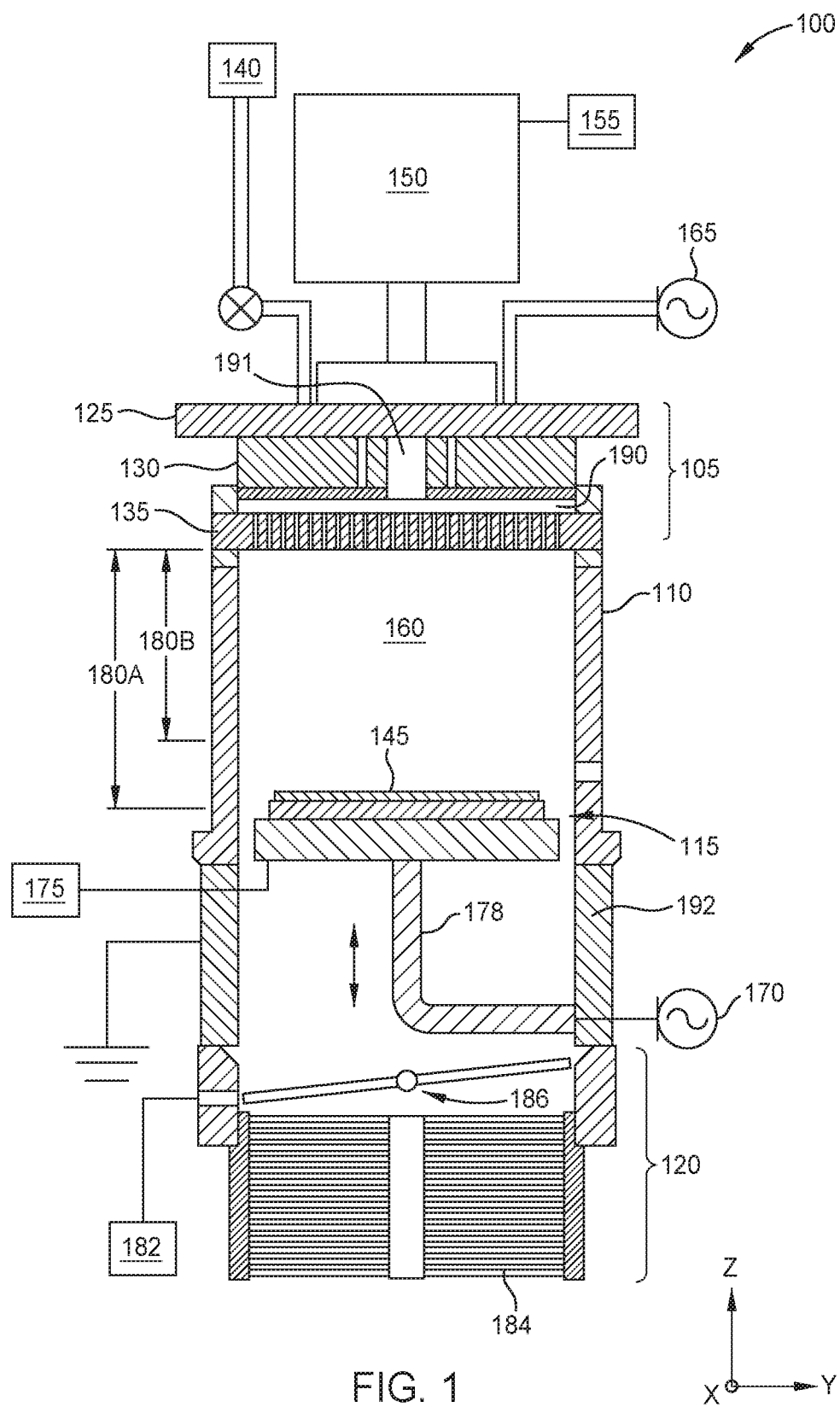
FIG. 1 is a schematic side cross sectional view of an illustrative processing chamber.

FIG. 1 is a schematic side cross sectional view of an illustrative processing chamber 100 suitable for conducting a deposition process. In one embodiment, the processing chamber 100 may be configured to deposit advanced patterning films onto a substrate, such as hardmask films, for example amorphous carbon hardmask films.

The processing chamber 100 includes a lid assembly 105, a spacer 110 disposed on a chamber body 192, a substrate support 115, and a variable pressure system 120. The lid assembly 105 includes a lid plate 125 and a heat exchanger 130. In the embodiment shown, the lid assembly 105 also includes a showerhead 135. However, in other embodiments, the lid assembly 105 includes a concave or dome-shaped gas introduction plate (shown in FIG. 7).

The lid assembly 105 is coupled to a processing gas source 140. The processing gas source 140 contains precursor gases for forming films on a substrate 145 supported on the substrate support 115. As an example, the processing gas source 140 includes precursor gases such as carbon containing gases, hydrogen containing gases, helium, among others. In a specific example, the carbon containing gas includes acetylene ($C_2H_2$). The processing gas source 140 provides precursors gases to a plenum 190 disposed in the lid assembly 105. The lid assembly includes one or more channels for directing precursor gases from the processing gas source 140 into the plenum 190. From the plenum, the precursor gases flow through the showerhead 135 into a processing volume 160.

The lid assembly 105 is also coupled to an optional remote plasma source 150. The remote plasma source 150 is coupled to a cleaning gas source 155 for providing cleaning gases to the processing volume 160 formed inside the spacer 110 between the lid assembly 105 and the substrate 145. In one example, cleaning gases are provided through a central conduit 191 formed axially through the lid assembly 105. In another example, cleaning gases are provided through the same channels which direct precursor gases. Example cleaning gases include oxygen-containing gases such as oxygen and/or ozone, as well fluorine containing gases such as $NF_3$, or combinations thereof.

In addition to or as an alternative to the remote plasma source 150, the lid assembly 105 is also coupled to a first or upper radio frequency (RF) power source 165. The first RF power source 165 facilitates maintenance or generation of plasma, such as a plasma generated from a cleaning gas. In one example, the remote plasma source 150 is omitted, and the cleaning gas is ionized into a plasma in situ via the first RF power source 165. The substrate support 115 is coupled to a second or lower RF power source 170. The first RF power source 165 may be a high frequency RF power source (for example, about 13.56 MHz or about 40 MHz) and the second RF power source 170 may be a low frequency RF power source (for example, about 2 MHz or about 13.56 MHz). It is to be noted that other frequencies are also contemplated. In some implementations, the second RF power source 170 is a mixed frequency RF power source, providing both high frequency and low frequency power. Utilization of a dual frequency RF power source, particularly for the second RF power source 170, improves film deposition. When utilizing a second RF power source 170 which provides dual frequency powers, such as 13.56 MHz and 40 MHz, the 13.56 MHz frequency improves implantation of species into the deposited film, which the 40 MHz frequency increases ionization and deposition rate of the film.

One or both of the first RF power source 165 and the second RF power source 170 are utilized in creating or maintaining a plasma in the processing volume 160. For example, the second RF power source 170 may be utilized during a deposition process and the first RF power source 165 may be utilized during a cleaning process (alone or in conjunction with the remote plasma source 150). In some deposition processes, the first RF power source 165 is used in conjunction with the second RF power source 170. During a deposition process, one or both of the first RF power source 165 and the second RF power source 170 provide a power of about 4 kilowatts (kW) to about 9 kW, such as about 4 kW to about 6 kW, in the processing volume 160 to facilitation ionization of a precursor gas.

The substrate support 115 is coupled to an actuator 175 that provides movement thereof in the Z direction. The substrate support 115 is also coupled to an electrical conduit 178 that allows vertical movement of the substrate support 115 while maintaining communication with the second RF power source 170 as well as other power and fluid connections. The spacer 110 is disposed on the chamber body 192. A height of the spacer 110 allows movement of the substrate support 115 vertically within the processing volume 160. In one example, the substrate support 115 is movable from a first distance 180A to a second distance 180B relative to the lid assembly 105 (for example, relative to a lower surface of the showerhead 135). In some embodiments the first distance 180A is about 14 inches and the second distance is about 11.2 inches. In contrast to conventional plasma enhanced chemical vapor deposition (PECVD) processes, the spacer 110 greatly increases the distance between (and thus the volume between) the substrate support 115 and the lid assembly 105. The increased distance between the substrate support 115 and the lid assembly 105 reduces collisions of ionized species in the processing volume 160, resulting in deposition of film with less tensile stress. Films deposited with less tensile stress facilitate improved planarity (e.g., less bowing) of substrates upon which the film is formed. Reduced bowing of substrates results in improved precision of downstream patterning operations.

The variable pressure system 120 includes a first pump 182 and a second pump 184. The first pump 182 is a roughing pump that may be utilized during a cleaning process and/or substrate transfer process. A roughing pump is generally configured for moving higher volumetric flow rates and/or operating a relatively higher (though still sub-atmospheric) pressure. In one example, the first pump maintains a pressure within the processing chamber of about 300 m-torr to about 800 m-torr, such as about 400 torr to about 6 m-torr, during a clean process. Utilization of a roughing pump during clean operations facilitates relatively higher pressures and/or volumetric flow of cleaning gas (as compared to a deposition operation). The relatively higher pressure and/or volumetric flow during the cleaning operation improves cleaning of chamber surfaces.

The second pump 184 may be a turbo pump that is utilized during a deposition process. A turbo pump is generally configured to operate a relatively lower volumetric flow rate and/or pressure. For example, the tubular molecular pump is configured to maintain the processing volume 160 of the process chamber at a pressure of less than about 10 mtorr, such about 5 mtorr or less, during a deposition process. The reduced pressure of the processing volume 160 maintained during deposition facilitates deposition of a film having reduced tensile stress and/or increased $sp^2$-$sp^3$ conversion, when depositing carbon-based hardmasks. Thus, process chamber 100 is configured to utilize both relatively lower pressure to improve deposition and relatively higher pressure to improve cleaning.

In some embodiments, both of the first pump 182 and the second pump 184 are utilized during a deposition process. A valve 186 is utilized to control the conductance path to one or both of the first pump 182 and the second pump 184. The valve 186 also provides symmetrical pumping from the processing volume 160.

FIGS. 2A and 2B are schematic sectional views of the electrical conduit 178. The electrical conduit 178 includes a first end 200 and a second end 205. The first end 200 interfaces with the substrate support 115 and the second end 205 interfaces with a facilities interface 215. The facilities interface 215 includes the second RF power source 170 (shown in FIG. 1) as well as an RF match (not shown).

The electrical conduit 178 is a single (unitary) composite conductor having a bend 210 formed therein. The terms "single" and/or "unitary" may be defined as having the indivisible character of a unit (i.e. whole). The electrical conduit 178 includes at least three pieces that are each formed as a unitary or single unit longitudinally. The terms "single" and/or "unitary" may be differentiated from conventional conductive members that include modular or discrete components that are welded, brazed or otherwise joined together.

The single unit is fabricated in a straight orientation and then bent to include the bend 210. Thus, the three pieces of the electrical conduit 178 are free from brazed joints or seams along a length thereof which increases the efficiency and/or operation thereof. The bend 210 is substantially 90 degrees wherein substantially is defined as +/−5 degrees. The three pieces include a central conductor 220, a dielectric sheath 225 and an outer conductor 230. The central conductor 220 is typically a metal having good electrical conductivity as well as thermal conductivity, such as copper (Cu). The dielectric sheath 225 is an electrically insulative material, such as a polymer material, for example polyether ether ketone (PEEK) or polytetrafluoroethylene (PTFE). The outer conductor 230 is a metallic material, such as aluminum.

The substrate support 115 includes an electrostatic chuck 235 and a facilities plate 240 separated by a dielectric layer 245. The central conductor 220 provides RF power to the facilities plate 240 while the outer conductor 230 functions a ground connection (e.g., electrically floating).

The electrical conduit 178 includes a first flange 246 at the first end 200 and a second flange 248 at the second end 205. The first flange 246 couples to the substrate support 115 and the second flange 248 couples to the facilities interface 215.

The electrical conduit 178 in FIG. 2A includes a central conduit 247 that may be utilized to transmit power or fluids from the facilities interface 215 to the substrate support 115. For example, the central conduit 247 may be utilized for providing chucking power to the electrostatic chuck 235. In another example, the central conduit 247 may be utilized for providing a coolant and/or a backside gas to the substrate support 115.

FIG. 2B is an enlarged partial sectional view of the electrical conduit 178 shown in FIG. 1A. The electrical conduit 178 includes a void or central opening 250 formed by the inside diameter of the central conductor 220. The central conduit 247 shown in FIG. 2A is not shown in the central opening 250 in FIG. 2B. The central conductor 220, which may be a tubular member, is shown between a first dielectric layer 255 and a second dielectric layer 260. The first dielectric layer 255 and the second dielectric layer 260 comprise the dielectric sheath 225. The outer conductor 230, which may be a tubular member, is shown outside of the second dielectric layer 260.

The electrical conduit 178 according to this embodiment is an improvement over conventional electrical cables or conductors. For example, the electrical conduit 178 includes the bend 210 (e.g., a curved or arcuate section) where conventional conductors would have a sharp L-shaped or 90 degree connection of two discrete conductors. The bend 210 eliminates arcing at the conventional 90 degree connection. Further, the conventional conductors include multiple pieces that are brazed at seams. The brazed seams have a higher electrical resistance than that of the central conductor 220. Thus, providing the electrical conduit 178 in one piece improves current flow along the central conductor 220. The single piece design also provides more robust insulation while also having a smaller outside diameter as compared to a conventional conductor.

Additionally, while the central conductor 220 is utilized to carry electrical power, the central conductor 220 is also utilized to conduct heat away from the substrate support 115. For example, testing of the substrate support 115 having the electrical conduit 178 coupled thereto was conducted that showed a significant decrease in temperature of the electrostatic chuck 235 as compared to conventional conductors.

One or both of the central opening 250 and the central conduit 247 may be utilized for transmitting power to the electrostatic chuck 235, routing of temperature probes, such as a thermocouple, as well as other electrical connections. The central opening 250 and/or the central conduit 247 is effectively shielded from RF noise which provides noise-free (or minimal noise) coupling with components disposed therein.

The electrical conduit 178 may be formed by fabricating the various conductors and dielectric layers in a straight (e.g., 180 degree) orientation and then bending the manufactured article from the straight orientation to include the bend 210. The central conduit 247 and the outer conductor 230 are vacuum annealed during initial manufacture. Then, the dielectric sheath 225 is provided over the central conductor 220. Thereafter, the outer conductor 230 is provided over the dielectric sheath 225 to form an unbent assembly. The first flange 246 and the second flange 248 are then welded onto the unbent assembly. After the welding, the unbent assembly is attached to a jig to form the bend 210. The electrical conduit 178 includes an outside diameter 270 prior to bending and the outside diameter after bending can be +/−0.06 inches at the bend 210.

Figure 3A:
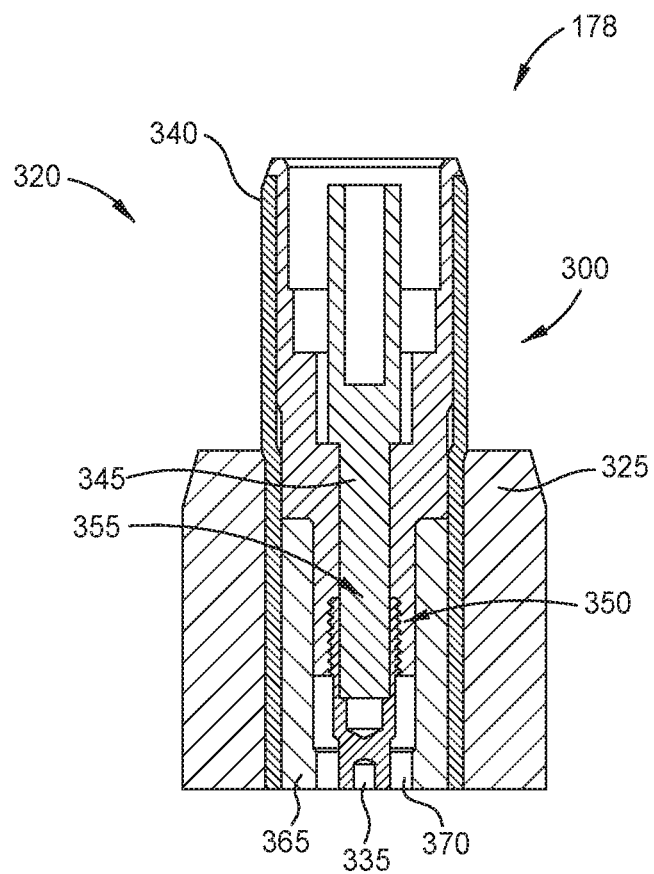
FIG. 3A is an enlarged sectional view of the first end of the electrical conduit of FIG. 2A.
Figure 3B:
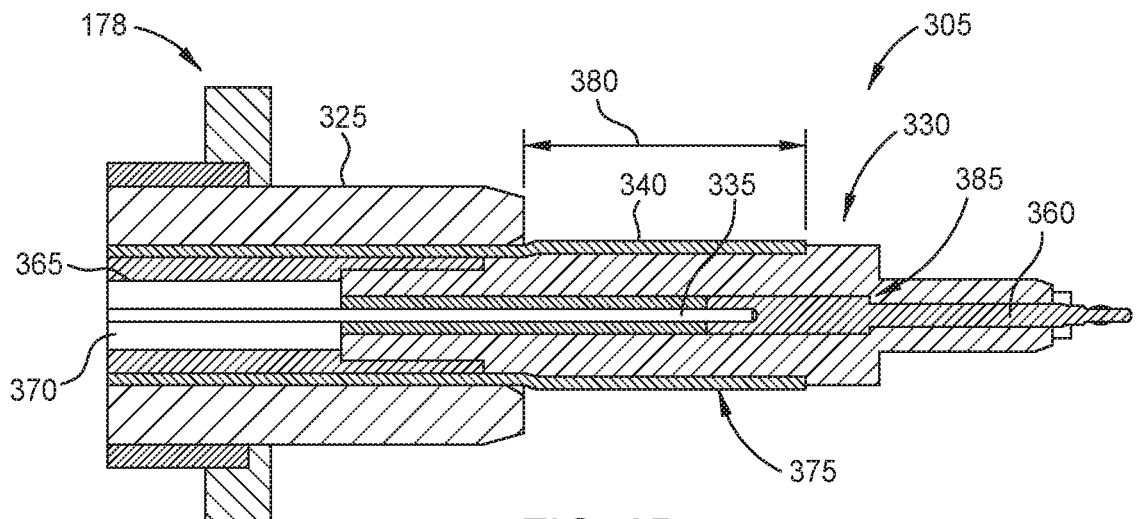
FIG. 3B is a sectional view of the second end of the electrical conduit of FIG. 2A.

FIG. 3A is an enlarged sectional view of the first end 200 of the electrical conduit 178. The first end 200 includes a connector 320 extending from an outer dielectric sheath 325. FIG. 3B is a sectional view of the second end 205 of the electrical conduit 178. The second end 205 also includes a connector 330 extending from the outer dielectric sheath 325.

The connector 320 and the connector 330 include a first conductor 335 located centrally within the outer dielectric sheath 325. The outer dielectric sheath 325 does not extend to a terminus of end of the electrical conduit 178 to allow coupling with a substrate support 115. The connector 320 and the connector 330 also include a second conductor 340 that substantially surrounds the first conductor 335.

Referring to the connector 320, the first conductor 335 is connected to a socket 345 that is coupled to the first conductor 335 by a conductive housing 350. The socket 345 and the conductive housing 350 include a threaded connection 355. Referring to the connector 330, the first conductor 335 is coupled to a male insert 360. The socket 345 is adapted to couple to a chucking electrode in the electrostatic chuck 235.

The first conductor 335 and the second conductor 340 are electrically separated by one or both of a dielectric material 365 and a space or gap 370 (within the central opening 250). The dielectric material 365 may be a polymeric material, such as PEEK, PTFE, or other polymeric and/or insulative materials. Both of the first conductor 335, the second conductor 340, the socket 345, the conductive housing 350 and the male insert 360 are made of an electrically conductive metal, such as copper.

The construction of the electrical conduit 178 as described herein provides an exposed interface surface 375 of the second conductor 340 that includes a length 380 greater than a length of conventional conductors. Additionally, the construction of the electrical conduit 178 as described herein provides a shoulder region or stop 385 for the male insert 360.

Figure 4:
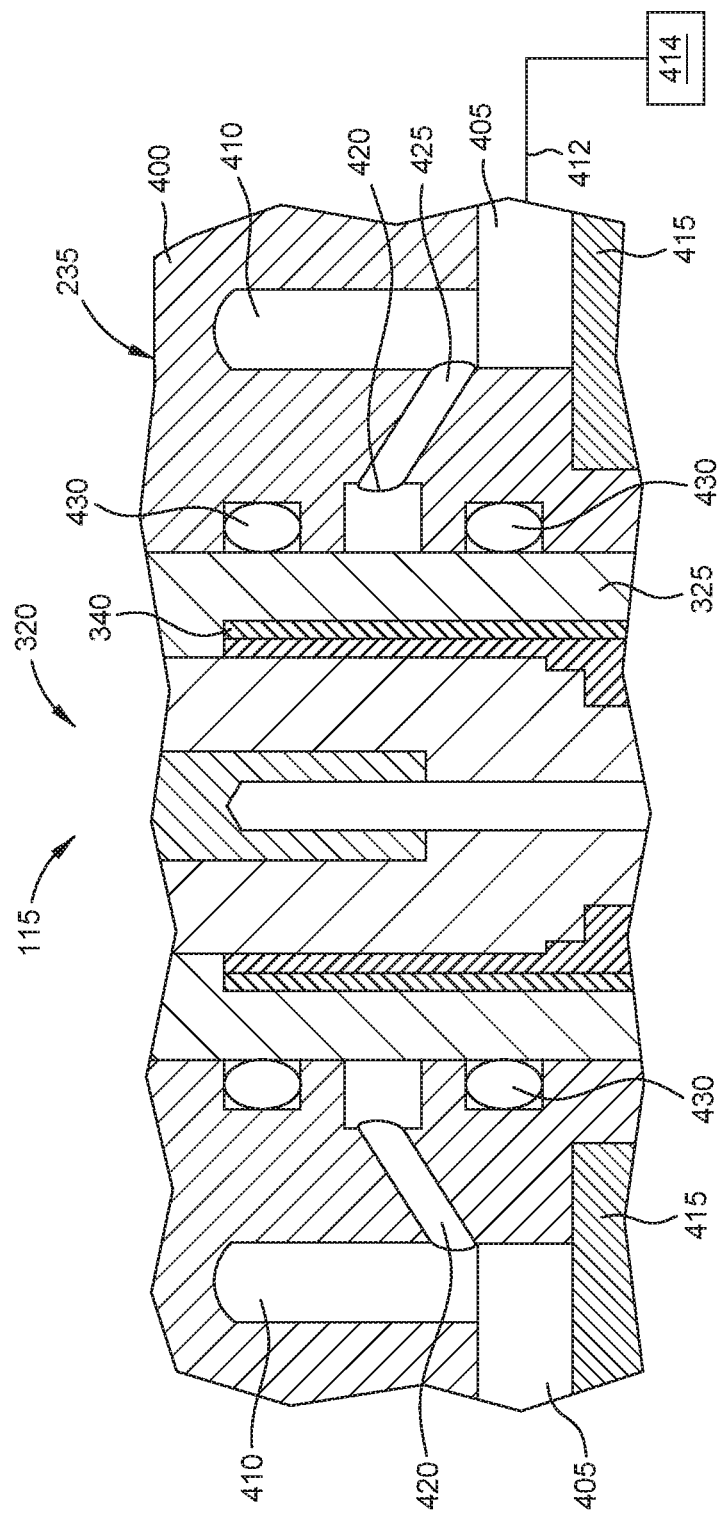
FIG. 4 is an enlarged sectional view of a portion of the electrostatic chuck of FIG. 2A.

FIG. 4 is an enlarged sectional view of a portion of the electrostatic chuck 235 and the connector 320. The electrostatic chuck 235 includes a puck 400. The puck 400 includes a plurality of radially oriented fluid channels 405 and a plurality of axially oriented fluid channels 410 formed therein that are in fluid communication with each other. Each of the fluid channels 405 are in fluid communication with an inlet conduit 412. The inlet conduit 412 is coupled to a coolant source 414. Each of the fluid channels 405 are sealed by a cap plate 415. The cap plates 415 may be made of the same material as the puck 400, or aluminum, and can be welded or otherwise bonded to the puck 400 to seal the fluid channels 405.

The coolant source 414 contains a coolant that chills the substrate support 115. For example, a coolant that from the coolant source 414 is flowed to the fluid channels 405 and/or the fluid channels 410 to maintain a temperature of the electrostatic chuck 235 (and/or a substrate positioned thereon). The temperature of the substrate support 115 may be maintained at about 0 degrees Celsius to about −10 degrees Celsius via the cooling fluid. The coolant includes a heat transfer fluid, for example heat transfer fluids sold under the tradename GALDEN®.

The fluid channels 410 are fluidly coupled to a circular channel 420 by central channels 425. The circular channel 420 substantially surrounds the connector 320. Fluid is flowed from the fluid channels 410 through the central channels 425 to the circular channel 420. Seals 430, such as elastomeric O-rings, prevent fluid from leaking out of the circular channel 420.

While the foregoing is directed to embodiments of the present disclosure, other and further embodiments of the disclosure can be devised without departing from the basic scope thereof, and the scope thereof is determined by the claims that follow.

The invention claimed is:

1. A unitary electrical conduit, comprising:
a central conductor comprising a first tube;
a socket coupled to a first end of the central conductor, wherein the socket includes a threaded connection;
a male insert coupled to a second end of the central conductor;
a dielectric sheath surrounding the central conductor; and
an outer conductor comprising a second tube surrounding the first tube and the dielectric sheath, wherein a substantially 90 degree bend is formed along a length thereof.

2. The unitary electrical conduit of claim 1, wherein the second end comprises a connector having a first conductor and a second conductor, the second conductor surrounding the male insert.

3. The unitary electrical conduit of claim 2, wherein the first conductor is electrically coupled to the male insert.

4. The unitary electrical conduit of claim 2, wherein the first conductor extends to the first end and the socket is electrically coupled to the first conductor.

5. The unitary electrical conduit of claim 1, wherein the male insert extends past an end of the dielectric sheath.

6. The unitary electrical conduit of claim 1, wherein the threaded connection provides electrical communication between the male insert and the socket.

7. The unitary electrical conduit of claim 1, wherein the dielectric sheath includes a first dielectric layer surrounded by a second dielectric layer.

8. The unitary electrical conduit of claim 1, further comprising a first flange and a second flange coupled to the outer conductor.

9. The unitary electrical conduit of claim 8, wherein the first flange is coupled to a first end of the outer conductor and the second flange is coupled to a second end of the outer conductor.

10. The unitary electrical conduit of claim 1, wherein the central conductor comprises a copper (Cu) material.

11. The unitary electrical conduit of claim 10, wherein the outer conductor comprises an aluminum (Al) material.

12. The unitary electrical conduit of claim 10, wherein the first tube is made of the copper (Cu) material.

* * * * *